(12) United States Patent
Benedetti

(10) Patent No.: US 10,392,200 B2
(45) Date of Patent: Aug. 27, 2019

(54) APPARATUS FOR DIVIDING HORTICULTURAL PRODUCTS

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 0 days.

(21) Appl. No.: 15/577,485

(22) PCT Filed: May 24, 2016

(86) PCT No.: PCT/IB2016/053028
§ 371 (c)(1),
(2) Date: Nov. 28, 2017

(87) PCT Pub. No.: WO2016/189456
PCT Pub. Date: Dec. 1, 2016

(65) Prior Publication Data
US 2018/0148270 A1    May 31, 2018

(30) Foreign Application Priority Data

May 28, 2015  (IT) .......................... 102015000018556

(51) Int. Cl.
*B65G 11/02*   (2006.01)
*B65G 47/22*   (2006.01)
(Continued)

(52) U.S. Cl.
CPC ............. *B65G 47/22* (2013.01); *A23N 15/00* (2013.01); *B65G 11/023* (2013.01);
(Continued)

(58) Field of Classification Search
CPC ........................... B65G 11/023; B65G 11/203
(Continued)

(56) References Cited

U.S. PATENT DOCUMENTS 3,065,777 A    11/1962   Allen et al.
3,770,123 A    11/1973   Mraz
(Continued)

FOREIGN PATENT DOCUMENTS

CN    101677510 A    3/2010
CN    202481733 U    10/2012
(Continued)

OTHER PUBLICATIONS

International Search Report dated Sep. 14, 2016 re: Application No. PCT/IB2016/053032; pp. 1-5; citing: US 2012/298565 A1, EP 0 704 253 A1 and US 3 770 123 A.
(Continued)

*Primary Examiner* — William R Harp
(74) *Attorney, Agent, or Firm* — Cantor Colburn LLP

(57) ABSTRACT

An apparatus for dividing horticultural products, propelled by a fluid for transport from an intake region connected to an upstream station to an evacuation region connected to a downstream station. The apparatus includes a supporting frame for a contoured floor, which is arranged so that a first edge is at said intake region and is arranged so that a second edge, arranged opposite the first edge, is at the evacuation region. The contoured floor includes a plurality of lanes interposed in a parallel arrangement between the regions and have a substantially V-shaped transverse cross-section so as to produce the progressive conveyance and alignment of the horticultural products in transit along the bottom of each lane.

7 Claims, 4 Drawing Sheets

(51) Int. Cl.
*A23N 15/00* (2006.01)
*B65G 11/20* (2006.01)
*B65G 47/44* (2006.01)

(52) U.S. Cl.
CPC ............ *B65G 11/203* (2013.01); *B65G 47/44* (2013.01); *A23N 2015/006* (2013.01); *B65G 11/20* (2013.01); *B65G 2201/0211* (2013.01)

(58) Field of Classification Search
USPC ........................................................ 406/155
See application file for complete search history.

(56) References Cited

U.S. PATENT DOCUMENTS

| | | | |
|---|---|---|---|
| 3,784,007 | A | 1/1974 | Skrmetta |
| 4,256,212 | A | 3/1981 | Markano |
| 4,901,861 | A | 2/1990 | Cicchelli |
| 8,991,617 | B2 * | 3/2015 | Greve .................... B07B 1/145 209/673 |
| 9,840,376 | B2 * | 12/2017 | White .................... B65G 51/01 |
| 2004/0200696 | A1 | 10/2004 | Gross et al. |
| 2012/0193272 | A1 | 8/2012 | Greve et al. |
| 2012/0298565 | A1 | 11/2012 | Maile et al. |
| 2013/0341257 | A1 * | 12/2013 | Greve .................... B07B 1/145 209/673 |
| 2014/0131172 | A1 | 5/2014 | Greve |

FOREIGN PATENT DOCUMENTS

| | | |
|---|---|---|
| CN | 104016083 A | 9/2014 |
| EP | 0704253 A1 | 4/1996 |
| EP | 2684461 A2 | 1/2014 |
| FR | 2824054 A1 | 10/2002 |
| FR | 2824055 A1 | 10/2002 |
| JP | S52146173 U | 11/1977 |
| JP | 5062416 B2 | 10/2012 |
| WO | 2011129810 A1 | 10/2011 |

OTHER PUBLICATIONS

Written Opinion dated Sep. 14, 2016 re: Application No. PCT/IB2016/053032; pp. 1-7; citing: US 2012/298565 A1, EP 0 704 253 A1 and US 3 770 123 A.
International Search Report dated Aug. 30, 2016 re: Application No. PCT/IB2016/053028; pp. 1-4; citing: EP 2 684 461 A2, FR 2 824 055 A1, US 4 901 861 A, US 2012/193272 A1, US 3 784 007 A, US 2014/131172 A1, JP S52 146173 U, US 2004/200696 A1 and FR 2 824 054 A1.
Written Opinion dated Aug. 20, 2016 re: Application No. PCT/IB2016/053028; pp. 1-7; citing: EP 2 684 461 A2, FR 2 824 055 A1, US 4 901 861 A, US 2012/193272 A1, US 3 784 007 A, US 2014/131172 A1 and JP S52 146173 U.

* cited by examiner

APPARATUS FOR DIVIDING HORTICULTURAL PRODUCTS

TECHNICAL FIELD

The present disclosure relates to an apparatus for dividing horticultural products.

BACKGROUND

The demand for horticultural products is met increasingly often by large companies, which are capable of responding to the constantly increasing (and exacting) demand of the market, ensuring at the same time the cost containment that is now an unavoidable requirement.

In order to be able to fulfill this task, companies in the field equip themselves with large facilities that are at least partially automated and are capable of transporting, checking and/or packaging a large number of products of interest in the unit time, limiting the role of the operator to a simple supervision of the process.

In this context, moreover, it should be noted that even when they are intended for the treatment of a specific fruit (or of another specific horticultural product), apparatuses of the type indicated above are usually fed with large masses of the product to be treated, which arrive directly from the harvesting fields and for this reason are very heterogeneous.

This situation occurs for example in apparatuses for the transport, checking and treatment of cherries.

These apparatuses are in fact usually fed with crates of cherries of various sizes, which are poured indiscriminately into a loading station, where they are struck by a stream of water that entrains them toward the stations assigned to the subsequent processes.

For example, one of the first stations that this stream of water (mixed indeed with cherries) encounters has the task of separating the cherries which, in groups of two or three, are still joined by means of their respective stems, since if this separation were not performed the groups might cause jamming or clogging in the subsequent stations designed for the handling and/or treatment of one cherry at a time.

In any case, it should be noted that indeed in order to be able to perform processes, checks or other treatments on individual cherries, it is necessary to provide downstream of the loading station at least one apparatus capable of dividing uniformly the indiscriminate mass of cherries entrained by the stream of water.

More precisely, in order to allow the execution of the subsequent processes, these apparatuses must direct the cherries toward a plurality of channels arranged downstream, in which said cherries must arrive aligned one behind the other in tidy and uniform rows.

This poses problems that are not easy to solve to the manufacturing companies, since often division is entrusted to systems which are inefficient, expensive and/or require the fruits to follow paths defined by means of barriers and partitions. These elements affect the flow and allow to divert the cherries toward a plurality of channels, obtaining the desired result, but only at the price of subjecting the cherries to impacts that are sometimes violent and damage irreparably an often unacceptable percentage of said fruits.

SUMMARY

The aim of the present disclosure is to solve the problems described above, by providing an apparatus that allows to divide effectively an indiscriminate mass of horticultural products, of the type for example of cherries.

Within this aim, the disclosure provides an apparatus that allows to divide an indiscriminate mass of horticultural products, of the type for example of cherries, without subjecting them to impacts or damage.

The disclosure also provides an apparatus that allows to direct cherries or other horticultural products toward the downstream stations, aligning them one behind the other in ordered and uniform rows.

The disclosure further provides an apparatus that allows to divide horticultural products with low costs.

The disclosure provides an apparatus that ensures high reliability in operation, can be obtained easily starting from commonly commercially available elements and materials and is safe in application.

This aim, as well as these and other advantages that will become better apparent hereinafter, are achieved by providing an apparatus for dividing horticultural products, propelled by a fluid for transport from an intake region, which can be connected to an upstream station, to an evacuation region, which can be connected to a downstream station, characterized in that it comprises a supporting frame for a contoured floor, which is arranged so that a first edge is at said intake region and is arranged so that a second edge, which is arranged opposite said first edge, is at said evacuation region, said contoured floor comprising a plurality of lanes which are interposed in a parallel arrangement between said regions and have a substantially V-shaped transverse cross-section for the progressive conveyance and alignment of the horticultural products in transit along the bottom of each one of said lanes.

BRIEF DESCRIPTION OF THE DRAWINGS

Further characteristics and advantages of the disclosure will become better apparent from the description of a preferred but not exclusive embodiment of the apparatus according to the disclosure, illustrated by way of nonlimiting example in the accompanying drawings, wherein.

DETAILED DESCRIPTION OF THE DRAWINGS

Figure 1:
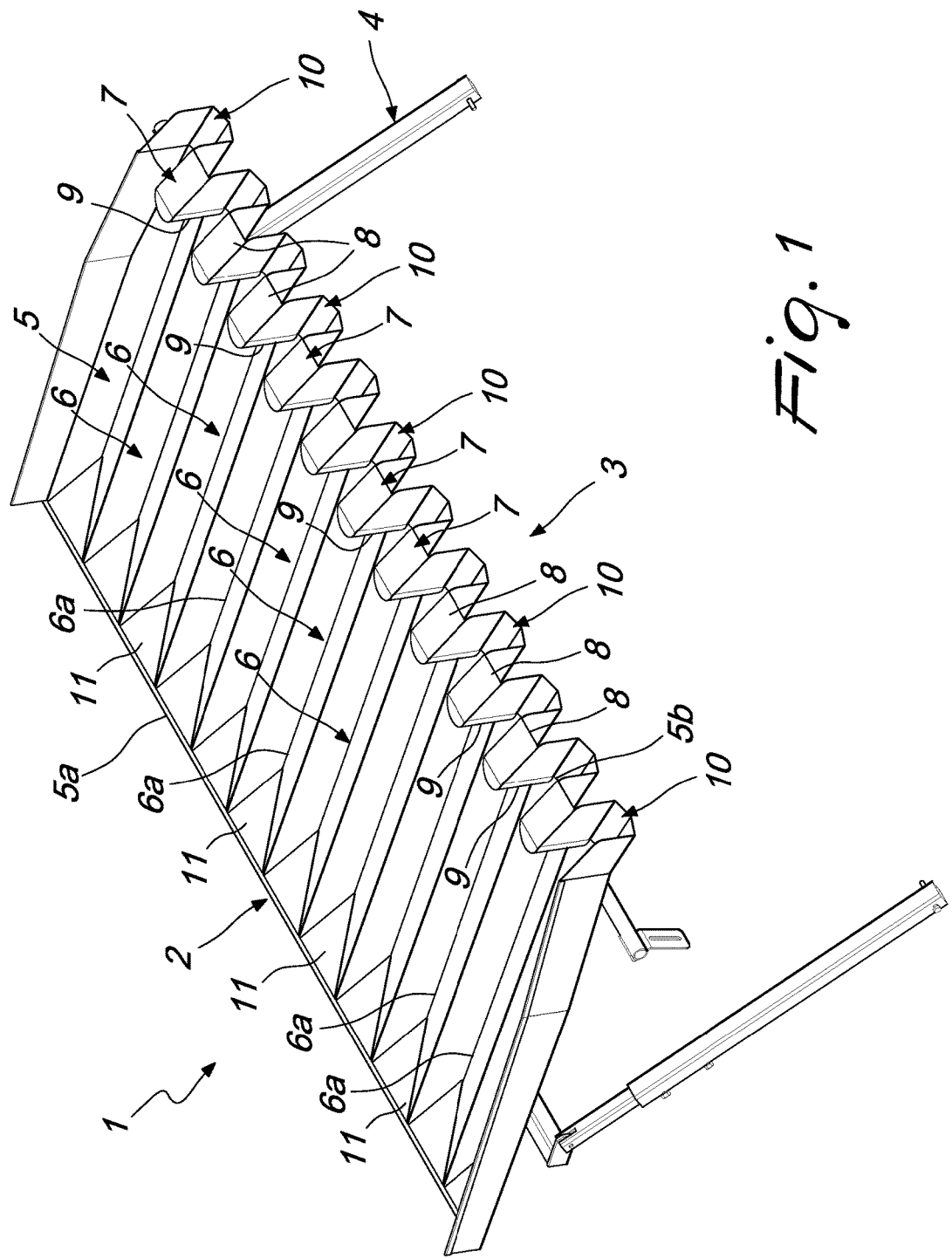
FIG. 1 is a perspective view of the apparatus according to the disclosure.
Figure 2:
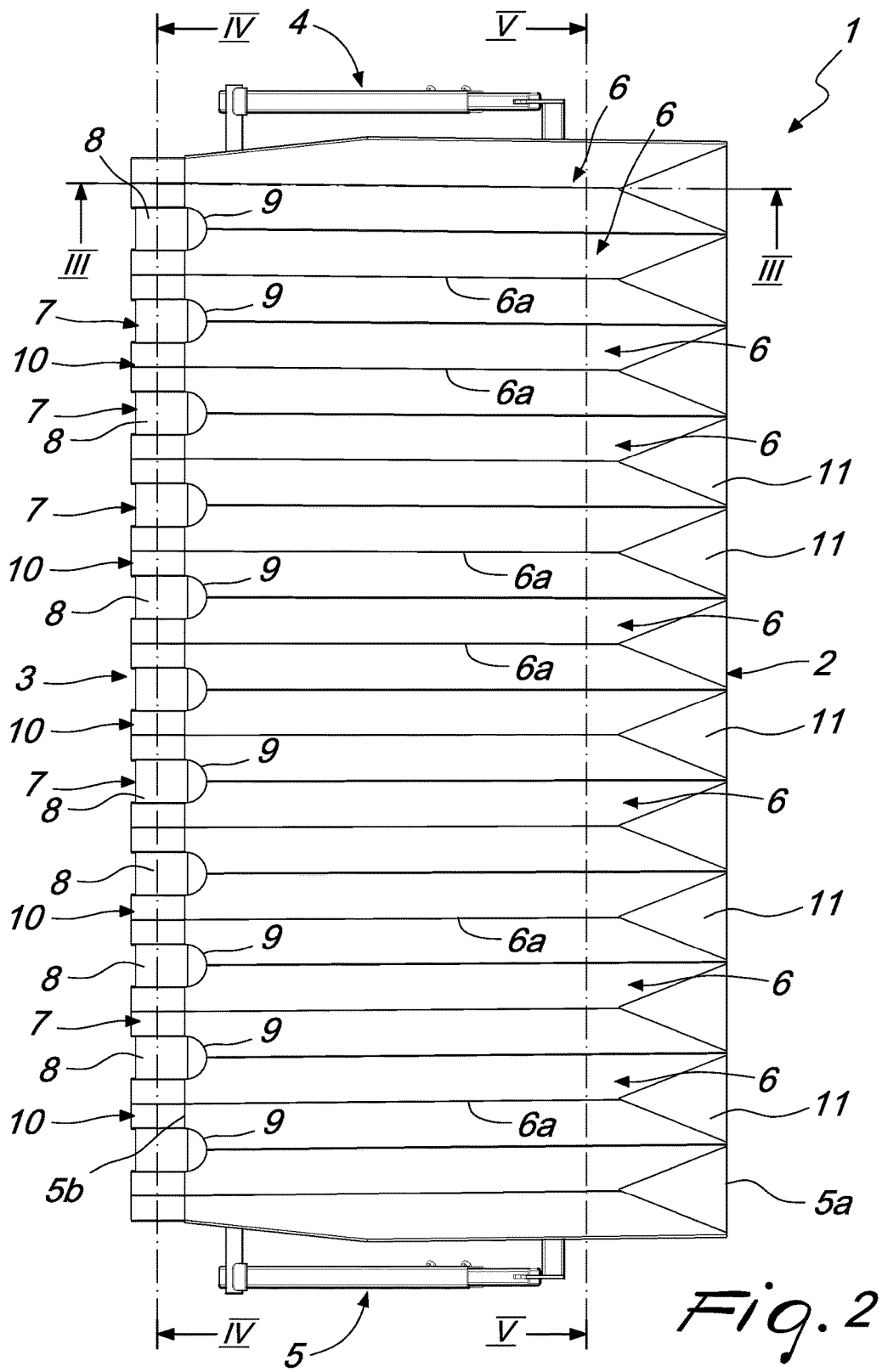
FIG. 2 is a top view of the apparatus of FIG. 1.
Figure 3:
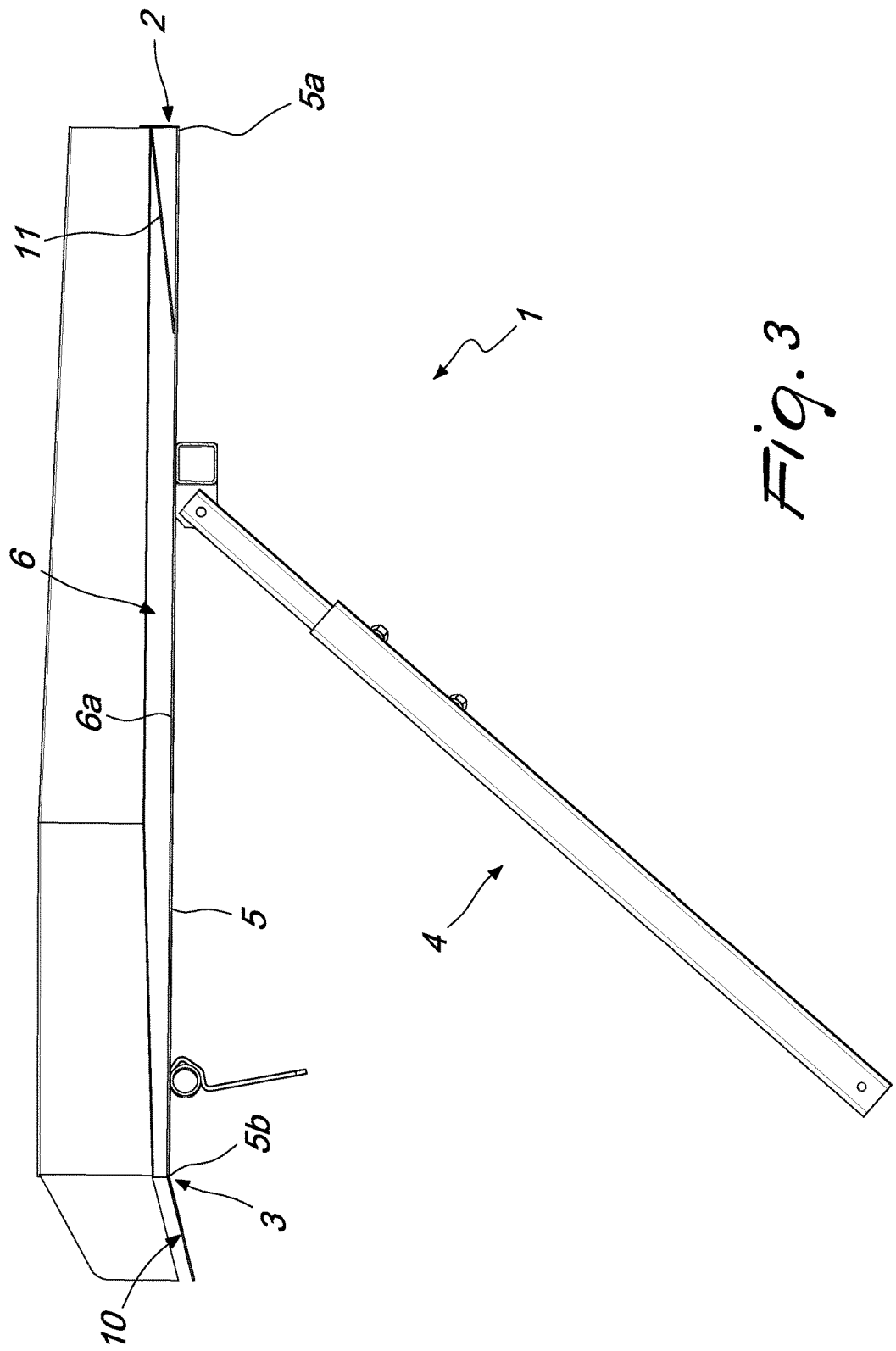
FIG. 3 is a sectional view of FIG. 2, taken along the line III-III.
Figure 4:
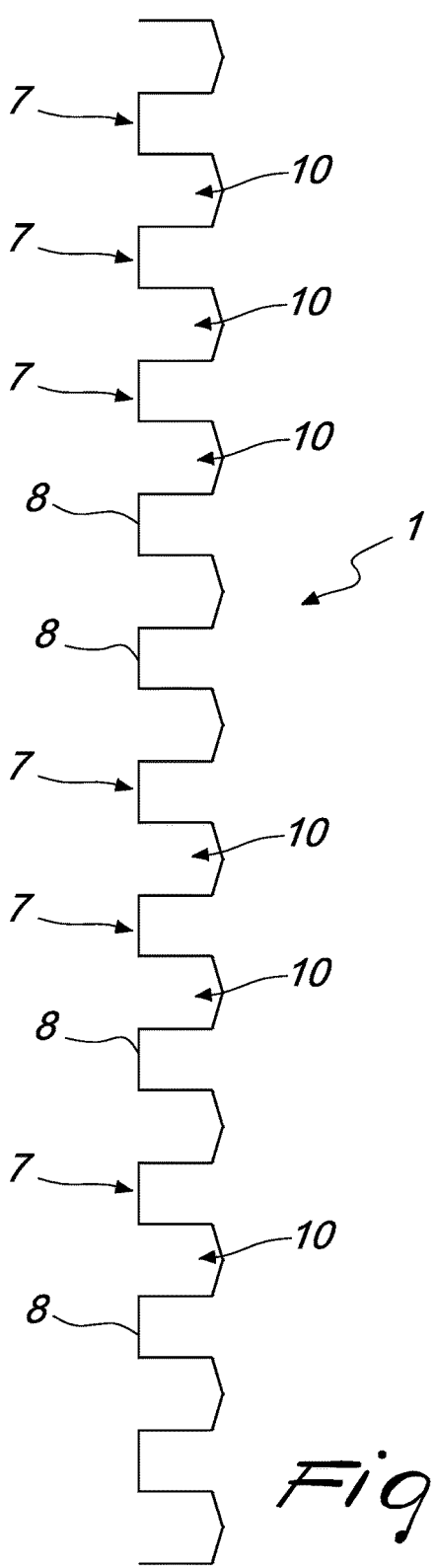
FIG. 4 is a sectional view of FIG. 2, taken along the line IV-IV.
Figure 5:
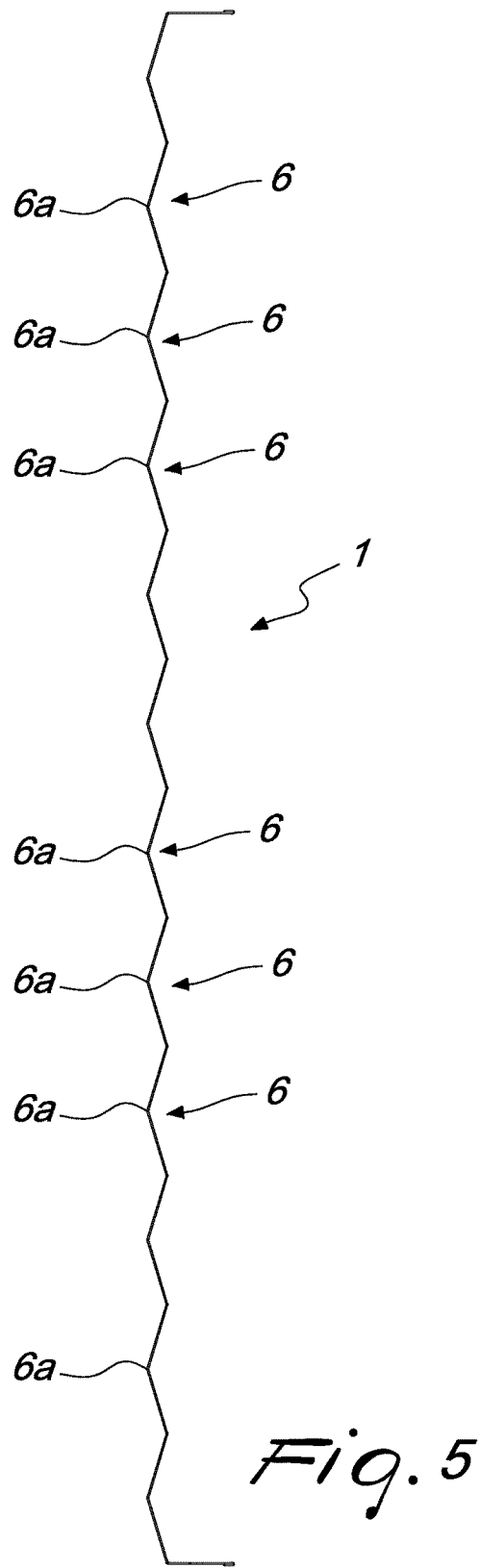
FIG. 5 is a sectional view of FIG. 2, taken along the line V-V.

With particular reference to FIGS. 1-5, the reference numeral 1 generally designates an apparatus intended to divide horticultural products while they are propelled by a transport fluid from an intake region 2, which can be connected to an upstream station, to an evacuation region 3, which can be connected to a downstream station.

It should be noted, therefore, that the apparatus 1 can find application in any point of lines for the treatment and transport of horticultural products where the requirement indeed arises to divide uniformly an indiscriminate mass of horticultural products entrained by a transport fluid, in order to align them in ordered rows and make them available to the subsequent stations in this configuration.

It should also be noted that in the preferred application the transport fluid is water, which, by gravity and/or because it is pressurized, entrains the horticultural products along the line; however, use of the apparatus 1 to divide horticultural products propelled by other liquids (or for example water mixed with appropriate additives) or also by air or other gases is not excluded.

It is deemed appropriate, further, to specify that in the preferred application of the disclosure, to which reference shall be made often in the continuation of the present description, the horticultural products are cherries.

For example, these products can arrive from an upstream station, assigned to the separation of the cherries that, in groups of two or three, are still joined by means of their respective stems.

Again, it should be specified once again in any case that the disclosure relates to the division of any type of horticultural product, and therefore to other types of fruit, or also vegetable, where needed by the specific requirements (and allowed by the shape of the product).

According to the disclosure, the apparatus 1 comprises a supporting frame 4 for a contoured floor 5, which is arranged with a first edge 5a at the intake region 2 and is arranged with a second edge 5b, arranged opposite the first edge 5a, at the evacuation region 3.

The contoured floor 5 comprises a plurality of lanes 6, which are interposed in a parallel arrangement between the regions 2, 3 (and are therefore oriented along the cherry transport direction).

It should be noted that the frame 4 may be any according to the specific requirements and can keep the lanes 6 substantially horizontal (entrusting the advancement of the cherries exclusively to the thrust of the water) or inclined (preferably downward in order to cause the advancement of the cherries also by gravity).

The lanes 6 have a substantially V-shaped transverse cross-section (see for example FIG. 5) so as to facilitate the progressive conveyance and alignment of the horticultural products in transit along the bottom 6a of each lane 6.

It should be noted, therefore, that the shape that has been usefully chosen allows from the outset to achieve the intended aim: the complementarily inclined walls of the lanes 6 cause the cherries entrained by the water to fall toward the bottom 6a, where they are forced to align themselves one by one in ordered rows. In the resulting configuration, the cherries continue their travel until they are delivered, thus divided, to the downstream processes.

The number of lanes 6 shaped by the floor 5 may obviously be any and is chosen preferably as a function of the requirements of the downstream stations.

Conveniently, the apparatus 1 comprises at least one auxiliary redirection element 7, which is interposed between a pair of adjacent lanes 6, substantially at the second edge 5b.

The redirection element 7 facilitates the conveyance of the movement for the handling fluid (and of the horticultural products entrained by it) toward such bottom 6a of the lanes 6.

Preferably, the apparatus 1 comprises a plurality of auxiliary redirection elements 7, interposed between respective pairs of adjacent lanes 6, substantially at the second edge 5b. Even more particularly, as in the solution proposed in the accompanying figures merely by way of illustration, each pair of adjacent lanes 6 is affected by a respective auxiliary redirection element 7.

With further reference to the accompanying figures, in a constructive solution of considerable practical interest, which is mentioned by way of example and does not limit the application of the disclosure, each auxiliary redirection element 7 comprises a pillar 8 that protrudes from the respective adjacent lanes 6, substantially at the second edge 5b of the floor 5.

Furthermore, the face 9 of the pillar 8 that is directed toward the lanes 6 has a curvilinear surface, which is conveniently contoured indeed to facilitate the conveyance of the transport fluid toward the bottom 6a of the lanes 6, thus avoiding any impact of the horticultural products with rigid elements of such apparatus 1.

Preferably (but not necessarily or in a limiting way), in the embodiment proposed in the accompanying figures the face 9 has a substantially semicylindrical shape (although the possibility to provide redirection elements 7 provided with pillars 8 that have a different shape, is indeed not excluded).

In practice, therefore, the curvilinear (for example semicylindrical) surface of the face 9 facilitates the correct channeling of the fluid without it making contact with the horticultural products entrained by such fluid (since they indeed remain along the center of the lane 6), thus avoiding impacts or damage.

Usefully, the apparatus 1 comprises at least one discharge channel 10, which is connected to a respective lane 6 at the second edge 5b.

Even more particularly, the apparatus 1 comprises a plurality of channels 10 (which preferably but not exclusively have a V-shaped cross-section), connected to respective lanes 6 and arranged downstream of corresponding redirection elements 7. For example, as in the accompanying figures, a channel 10 is arranged downstream of each lane 6.

Advantageously, the apparatus 1 according to the disclosure comprises at least one chute 11, which is arranged at the inlet of a respective lane 6, in order to offer an aid to the conveyance of the horticultural products in transit, toward the bottom 6a of each lane 6.

More particularly, the apparatus 1 comprises a plurality of chutes 11, arranged at the respective inlets of corresponding lanes 6 (therefore, for example, each lane 6 can be associated with a respective chute 11, as in the constructive solution shown in the accompanying figures).

Favorably, the floor 5 is constituted substantially by a metal plate that is folded so as to form the lanes 6; it should be noted that the pillars 8 and/or the chutes 11 also can be provided by means of appropriately folded metal plates.

However, it is useful to specify that the use of different materials for the floor 5 (and the other components of the apparatus 1 according to the disclosure) is not excluded.

Operation of the apparatus according to the disclosure is therefore evident from what has been described so far (and from the accompanying figures).

As already shown, in fact, while they are propelled by the water from the intake region 2 to the evacuation region 3, the cherries (or other horticultural product) are automatically made to fall toward the bottom 6a of the lanes 6 by way of the V-shaped configuration of such lanes (and therefore by the complementarily inclined walls that form them and merge indeed at the bottom 6a).

Even if some cherries approach the evacuation region 3 while remaining far from the bottom 6a (for example due to an excessive thrust of the water or by bouncing off underlying cherries), the redirection elements 7 avoid the danger that they might leave the apparatus 1 in a different manner than desired (i.e., not correctly aligned in ordered rows along the bottom 6a of the lanes 6).

As shown, the redirection elements 7 in fact re-channel the fluid toward the bottom 6a of the lanes 6 and therefore, without any impact or degradation (the redirection elements 7 in fact are never struck by the conveyed horticultural products), the cherries are in any case conveyed toward the bottom 6a as desired.

Furthermore, proximate to the intake region 2 the presence of the chutes 11, also directed toward the bottom 6a of the lanes 6, further facilitates the desired conveyance of the cherries indeed toward the bottom 6a.

By way of the V-shaped configuration, the bottom 6a has a reduced passage section, and therefore in each lane 6, at least proximate to the evacuation region 3, the cherries are aligned automatically in ordered rows, in which the cherries advance one at a time or at the most in small side-by-side groups.

In this configuration, therefore, the cherries reach the respective channel 10 (or in any case the respective portion of the second edge 5b), from where they can be delivered to the downstream processes, where indeed this ordered distribution is required.

The apparatus 1 therefore allows to divide an indiscriminate mass of cherries (or other horticultural products) on a plurality of uniform rows; this result is also achieved without subjecting the products to impacts or damage, since conveyance is obtained simply by gravity and by way of the inclination of the walls of the lanes 6 (with the optional aid of the chutes 11 and of the redirection elements 7).

Furthermore, it should be noted that division and conveyance are obtained with a solution that is unquestionably simple, has a small number of components and can be obtained easily with simple manufacturing processes: this ensures the low cost of the apparatus 1 and the possibility to achieve the desired goal with low costs.

In practice it has been found that the apparatus according to the disclosure achieves fully the intended aim, since resorting to a supporting frame for a contoured floor that comprises a plurality of lanes that have a substantially V-shaped transverse cross-section for the progressive conveyance and alignment of the horticultural products in transit along the bottom of such lanes allows to divide effectively an indiscriminate mass of horticultural products of the type for example of cherries.

The disclosure thus conceived is susceptible of numerous modifications and variations; all the details may further be replaced with other technically equivalent elements.

In the examples of embodiment shown, individual characteristics, given in relation to specific examples, may actually be interchanged with other different characteristics that exist in other exemplary embodiments.

In practice, the materials used, as well as the dimensions, may be any according to requirements and to the state of the art.

The disclosures in Italian Patent Application no. 102015000018556 (UB2015A001290), from which this application claims priority, are incorporated herein by reference.

The invention claimed is:

1. An apparatus for dividing horticultural products, propelled by a fluid for transport from an intake region, connected to an upstream station, to an evacuation region, connected to a downstream station, the apparatus comprising: a supporting frame for a contoured floor, arranged so that a first edge is at said intake region and arranged so that a second edge, arranged opposite said first edge, is at said evacuation region, said contoured floor comprising a plurality of lanes interposed in a parallel arrangement between said regions and have a substantially V-shaped transverse cross-section for a progressive conveyance and alignment of the horticultural products in transit along a bottom of each one of said lanes, and further comprising at least one auxiliary redirection element interposed between a pair of said adjacent lanes, substantially at said second edge, for the conveyance of the transport fluid toward said bottom of said lanes, wherein said at least one auxiliary redirection element comprises a pillar that protrudes from the respective said adjacent lanes, substantially at said second edge, the face of said pillar that is directed toward said lanes having a curvilinear surface configured for the conveyance of the transport fluid towards said bottom of said lanes, and wherein said face has a substantially semi-cylindrical surface.

2. The apparatus according to claim 1, further comprising a plurality of said auxiliary redirection elements interposed between respective pairs of said lanes adjacent substantially at said second edge.

3. The apparatus according to claim 1, further comprising at least one discharge channel connected to a respective said lane at said second edge.

4. The apparatus according to claim 3, further comprising a plurality of said channels connected to respective said lanes and arranged downstream of corresponding said redirection elements.

5. The apparatus according to claim 1, further comprising at least one chute arranged at the inlet of a respective said lane to aid the conveyance of the horticultural products in transit towards the bottom of the respective said lane.

6. The apparatus according to claim 5, further comprising a plurality of said chutes arranged at the respective inlets of corresponding said lanes.

7. The apparatus according to claim 1, wherein said floor is substantially constituted by a metal plate folded to form said lanes.

* * * * *